United States Patent [19]

Henderson

[11] 4,226,129
[45] Oct. 7, 1980

[54] WORM DRIVE MECHANISM

[76] Inventor: Harvey Henderson, P.O. Box 84, Palm Desert, Calif. 92260

[21] Appl. No.: 895,538

[22] Filed: Apr. 12, 1978

[51] Int. Cl.$^2$ .................. F16H 27/02; F16H 29/20
[52] U.S. Cl. ........................ 74/89.15; 74/424.8 R
[58] Field of Search ............ 74/89.15, 424.8 R, 501 R; 49/352

[56] References Cited

U.S. PATENT DOCUMENTS

| | | | |
|---|---|---|---|
| 1,122,649 | 12/1914 | Sears | 74/424.8 R |
| 2,299,785 | 10/1942 | Barrett | 74/424.8 R |
| 2,634,370 | 4/1953 | Carlson | 74/424.8 R |
| 2,919,911 | 1/1960 | Furtan | 74/89.15 |
| 2,953,934 | 9/1960 | Sundt | 74/424.8 R |
| 3,156,132 | 11/1964 | Borie | 74/424.8 R |
| 3,163,054 | 12/1964 | Werner | 74/501 R |
| 3,411,373 | 11/1968 | Zieber et al. | 74/501 R |
| 3,691,858 | 9/1972 | Wilke | 74/424.8 R |
| 4,074,463 | 2/1978 | Colanzi | 74/424.8 R |

*Primary Examiner*—Lawrence J. Staab
*Attorney, Agent, or Firm*—Fulwider, Patton, Rieber, Lee & Utecht

[57] ABSTRACT

A drive mechanism including a nut rotatable within a sleeve and a worm that extends through the nut and is threadedly engaged by it. The nut is locked to the sleeve for joint rotation so that rotation of the sleeve produces longitudinal movement of the worm. Flexibility of the worm avoids alignment problems. The worm is formed by a helical member received by the thread grooves of the nut and an internal restrainer connected at a plurality of points to the helical member. A release mechanism can be actuated to permit free longitudinal movement of the nut with the worm, so that the worm and the structure to which it is connected can be moved without rotation of the nut, if necessary.

A plurality of telescopically internested members can be arranged to receive the worm as it is extended, thereby enabling it to withstand compressive forces. When withdrawn, the worm can be coiled and stored in a magazine.

14 Claims, 5 Drawing Figures

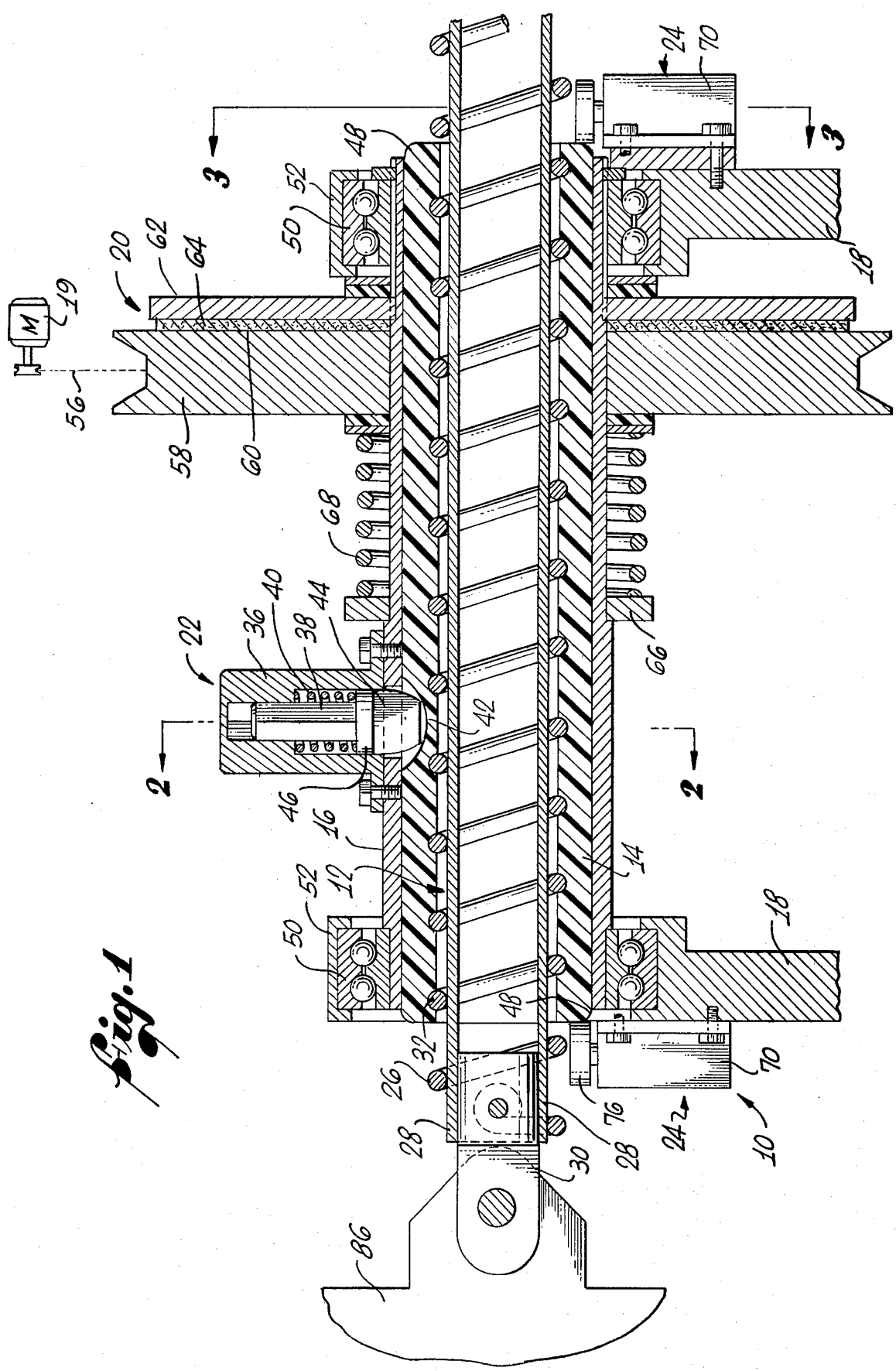

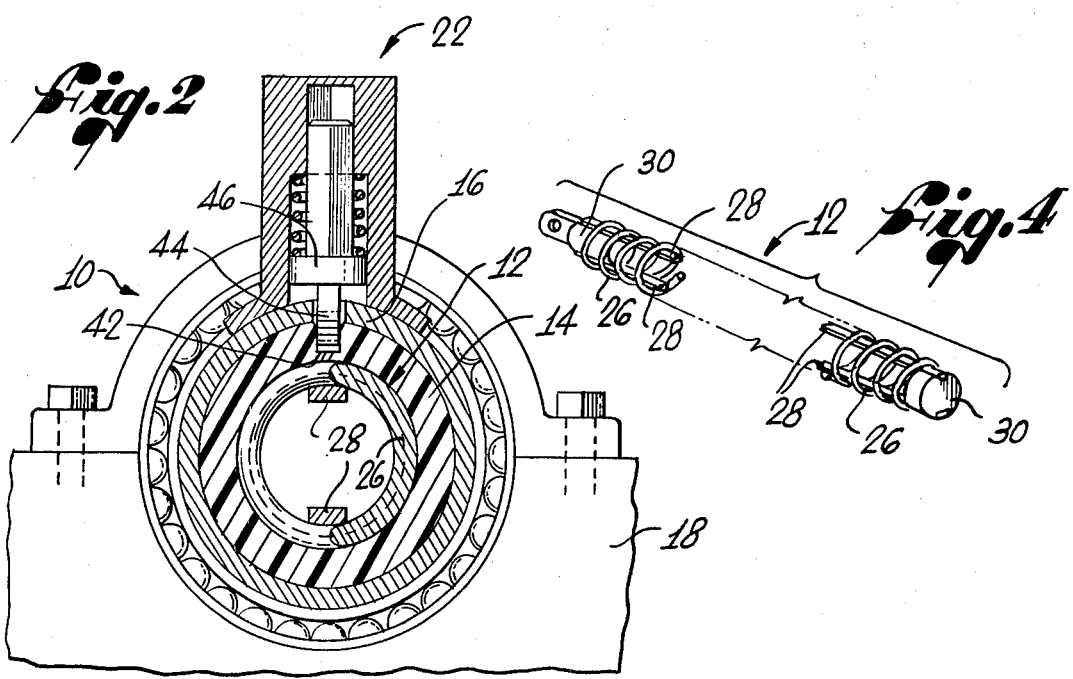
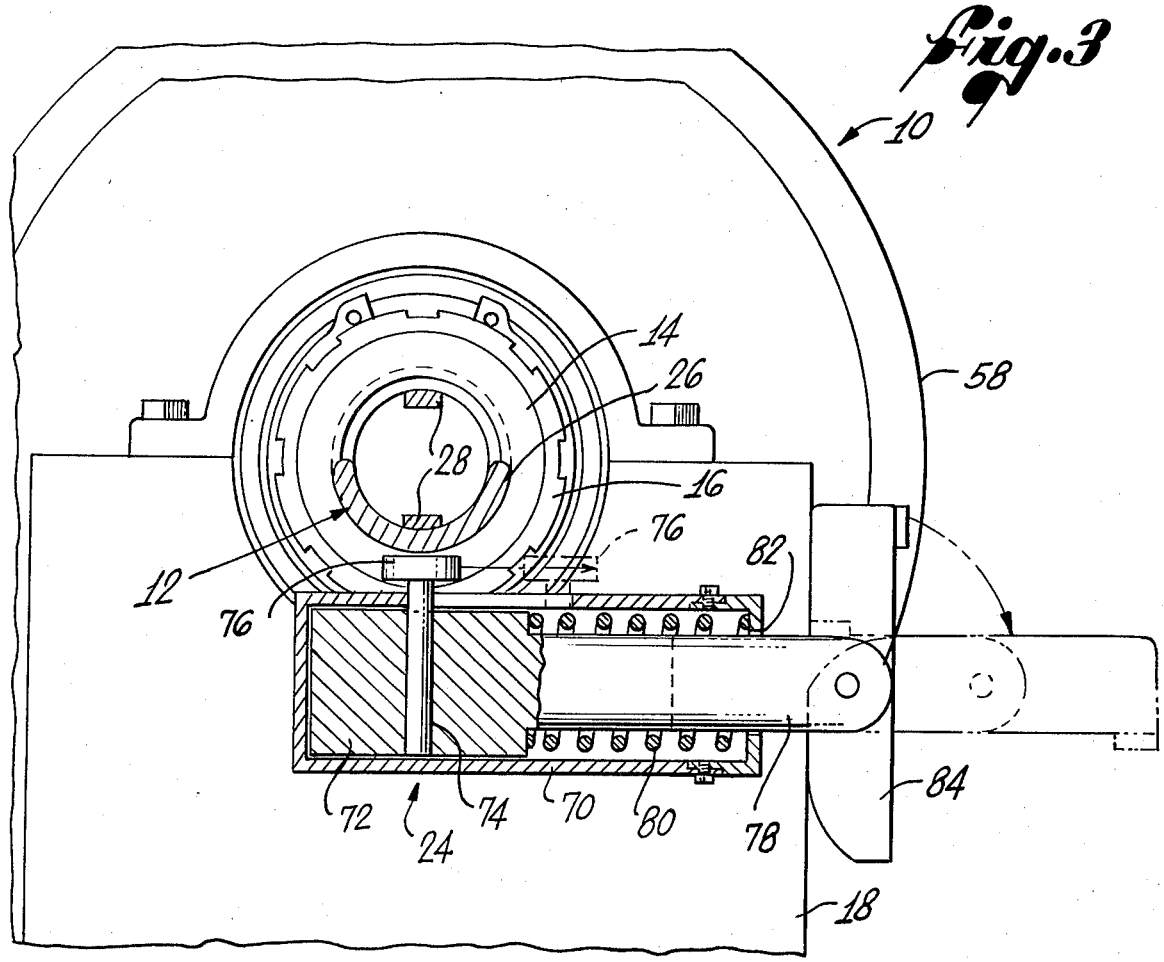

WORM DRIVE MECHANISM

BACKGROUND OF THE INVENTION

The present invention relates to drive mechanisms, and, more particularly, to such mechanisms in which the rotation of a nut causes a worm to be driven longitudinally.

It is conventional to use worm drive mechanisms to convert rotary motion to longitudinal motion, examples of previously known mechanisms of this type being described in U.S. Pat. Nos. 1,463,899 to McKechnie; 2,286,249 to Abbe and 2,315,571 to Wilder. Generally a worm, formed by a solid, rigid, externally threaded shaft, is driven by the rotation of a nut. When a large longitudinal displacement is required, a worm of suitable length is expensive to manufacture and ship. If the mechanism is attached to a structure that precludes precise alignment, jamming of the mechanism or damage to the threads may result. Moreover, a conventional worm drive mechanism can create an inconvenient or even dangerous situation since the worm may be immobilized or is movable only with great difficulty in the event of a power failure or a malfunction that prevents the nut from turning.

One potential application of worm drive mechanisms in which the above-mentioned disadvantages pose particularly difficult problems is in door opening devices powered by relatively small electric motors. If, for example, the sliding door of an industrial building or aircraft hangar were to be opened by a worm drive mechanism, a very lengthy worm would be required that might render the device impractical, especially when cost limitations are considered, since a worm forty feet or more in length might be needed. The play typically found in doors prevents precise alignment, and the drive mechanism could easily become jammed to prevent the door from being opened quickly in the case of an emergency. In the event of a power failure, it might be necessary to disassemble the mechanism before the door could be opened.

An objective of the present invention is to provide a worm drive mechanism that overcomes many disadvantages mentioned above.

SUMMARY OF THE INVENTION

According to one aspect of the present invention, a drive mechanism includes an internally threaded nut and an elongated worm shaped to be engaged by the threads of the nut so that rotation of the nut produces longitudinal movement of the worm. One aspect of the invention relates to the construction of the worm itself which includes a spring-like helical member that engages the threads of the nut and a retainer that is positioned within the coil and attached to helical member adjacent its ends and at intermediate points along its length. The worm can be made flexible to avoid alignment problems. It is also light in weight, is inexpensively manufactured and can be rolled up into a coil for shipping.

If it is desired that the worm be capable of withstanding compressive forces, a plurality of rigid telescopically internested members can be arranged to receive the worm as it is extended. When withdrawn, the worm can be coiled and stored in a magazine.

So that the worm can be moved longitudinally without rotation of the nut, a release mechanism is provided which normally prevents longitudinal nut movement but frees the nut when actuated. In a preferred arrangement, the release mechanism includes a blocking member having a restraining position in which it engages an end of the nut and an actuated position in which it does not engage the nut. A pair of blocking members can be used, one at each end of the nut, to permit release in either of two opposite directions and release springs can be used to bias the blocking members toward their restraining positions. The locking members can be made rotatable to minimize friction as the nut turns.

The nut is surrounded by a sleeve, the nut and sleeve being rotationally locked together by a locking mechanism so that the sleeve can be used to drive the nut. Preferably, the locking mechanism is formed by a recess in the nut engaged by a drive member carried by the sleeve and a spring that biases the drive member into the recess. The recess can be a tapered longitudinal groove that causes the locking member to be cammed into a disengaged position when the nut is moved longitudinally.

The drive mechanism may further include a clutch having a first clutch plate integrally fixed to the sleeve and a second clutch plate axially movable on the sleeve. An electric motor or other rotary power source is connected to the sleeve by the clutch.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a cross-sectional view of a worm drive mechanism constructed in accordance with the present invention;

FIG. 2 is a cross-sectional view, taken substantially along the line 2—2 of FIG. 1, showing the locking mechanism;

FIG. 3 is a cross-sectional view taken substantially along the line 3—3 of FIG. 1, showing the release mechanism;

FIG. 4 is a partially broken away perspective view, on a reduced scale, of the worm of the mechanism.

DESCRIPTION OF THE PREFERRED EMBODIMENT

Figure 5:
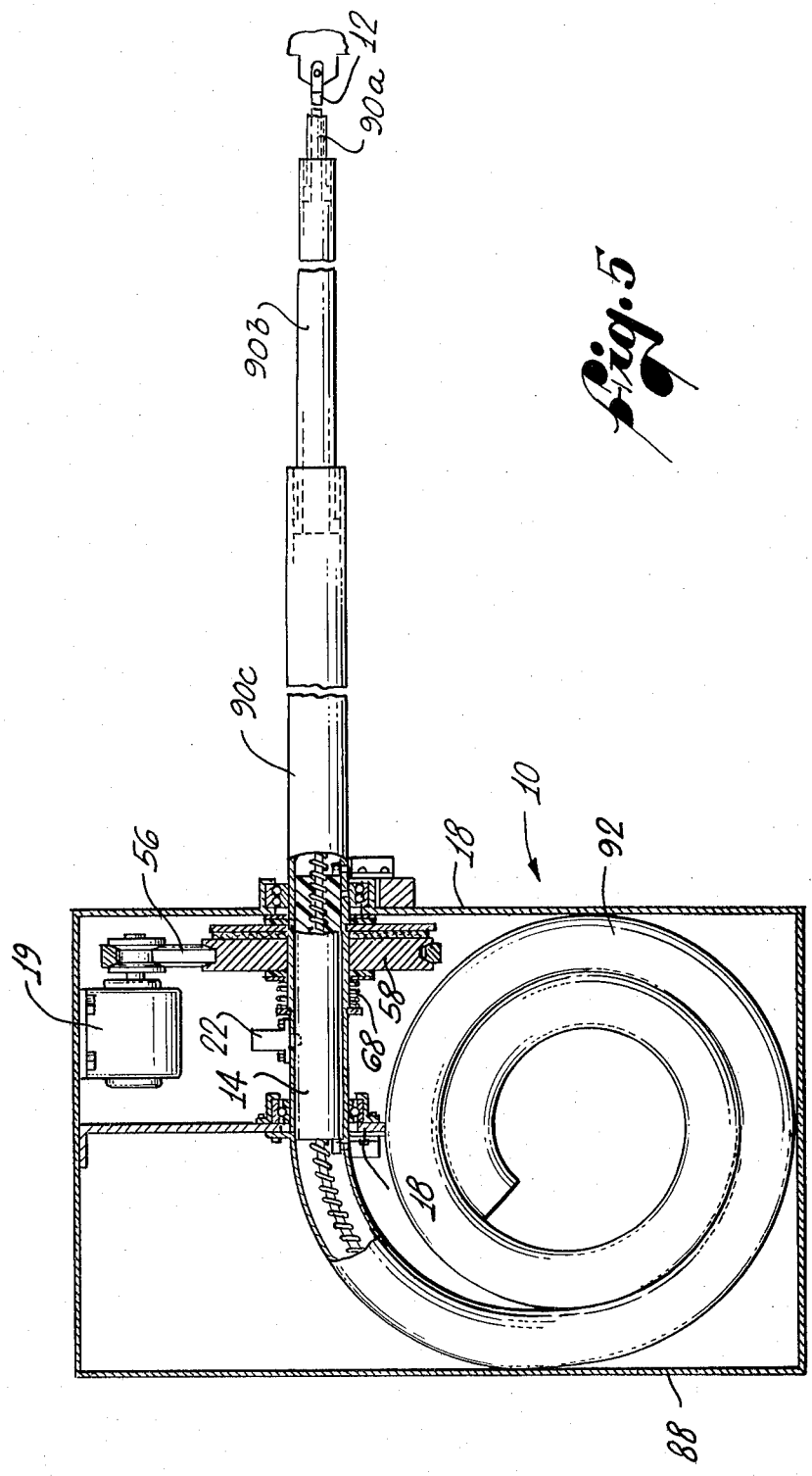
FIG. 5 is a partially broken away plan view of a worm drive mechanism, similar to that of FIG. 1, adapted to withstand compressive forces and provided with a magazine for storing the worm when not in use.

A drive mechanism 10 for converting rotary motion to longitudinal motion, shown in FIG. 1 of the accompanying drawings, embodies many novel features of the present invention. In general, it includes an elongated worm 12 engaged by a nut 14, a sleeve 16 in which the nut is held, a support 18 for the sleeve, and a motor 19 that is connected to the sleeve through a clutch 20. The sleeve 16 is locked to the nut 14 for joint rotation by a locking mechanism 22 and the nut is normally held against longitudinal movement by a pair of release mechanisms 24.

The worm 12 itself (best shown in FIGS. 1 and 4) is of a unique, flexible construction. Instead of the conventional rigid shaft that is externally threaded, the worm 12 is formed by an elongated, spring-like, steel member 26 of circular cross section would in the shape of a helix. A pair of spaced-apart parallel metal restraining rods 28 extend through the helix, the rods bearing against the inside surface of the helix at diametrically opposed positions. At each end of the worm 12, the rods are connected to the helix and held in their spaced-apart position by an end piece 30 that spans the distance between them. The helical member 26, rods 28 and pieces 30 are joined together by spot welding. Longitudinal displacement of the helical coils is prevented by welding the rods 28 to the coils at intermediate points between their ends. In some cases it is desirable to weld the rods to every second or third coil.

Since the worm 12 is flexible, it can be wound about a drum or coiled like a rope for shipping. When in use, it can be bent around corners (of sufficient radius) if necessary. Due to its inherent flexibility, it can bend to compensate for misalignment with the nut 14, thereby avoiding jamming of the mechanism 10. Nevertheless, it has sufficient tensile strength for many applications but is relatively inexpensive to manufacture and light in weight.

The nut 14 is a generally cylindrical, hollow, plastic member of annular cross section with a helical internal thread forming groove 32. Since the thread groove 32 of the nut 14 is of the same size and pitch as the helical member 26, the nut threadedly receives the worm 12, and rotation of the nut produces longitudinal movement of the worm.

The sleeve 16 is a metal cylinder in which the nut 14 is received. To cause the sleeve 16 to drive the nut 14 rotationally, the locking mechanism 22 (shown in FIGS. 1 and 2) includes a small housing 36 mounted on the cylindrical outside surface of the sleeve and a drive pin 38 that is disposed within the housing so that it can reciprocate radially with respect to the sleeve and the nut. A coil spring 40 surrounds the pin 38 and biases it radially inwardly toward the nut 14. When the nut 14 assumes the proper rotational position within the sleeve 16, a recess 42 in the nut receives the drive pin 38. The recess 42 takes the form of a longitudinal groove extending axially along the outer surface of the nut 14, the groove being tapered radially inwardly from both ends so that it has maximum depth at its center.

A head 44 on the inwardly projecting end of the drive pin 38 is rounded in the direction of longitudinal worm movement and carries a transversely extending stop member 46 that engages the outer surface of the sleeve 16 to limit movement of the pin toward the nut 14 under the force of the spring pin 40. When the nut 14 is moved axially within the sleeve 16, the tapered bottom surface of the groove 42 cams the head 44 upwardly into the housing 36, so that the pin 38 does not interfere with longitudinal nut movement.

To facilitate insertion of the nut 14 in the sleeve 16, the corners 48 of the nut, where its cylindrical surface meets its flat ends, are rounded to cam the pinhead 44 radially outwardly into the housing 36 as the nut 14 is pushed axially into the sleeve 16. The pin 38 then snaps into the groove 42 under the force of the locking spring 40 once the sleeve 16 has been rotated to bring the groove 42 to the proper position.

The support 18 is in the form of a yoke on which the ends of the sleeve 16 are rotatably mounted and engaged by a pair of roller bearings 50, each held in place by arcuate bearing brackets 52. Power to rotate the sleeve 16, thus driving the worm 12, is supplied from the electric motor 19 by a V-belt 56 that engages a wheel 58 rotatable and axially movable on the sleeve 16. A circular face 60 of the wheel 58 forms one plate of the clutch 20. Other components of the clutch 20 include another plate 62 integrally formed with the sleeve 16 and a disk 64 of high friction material that is freely rotatable on the sleeve between the two plates 60 and 62. A collar 66 is integrally formed on the outside of the sleeve 16 on the opposite side of the wheel 58 from the integrally formed plate 62, and a clutch spring 68 that encircles the sleeve between the collar and the wheel urges the wheel against the disk 64 and the integrally formed plate 62. The spring 68 thereby biases the clutch 20 toward an engaged position. One function of the clutch 20 is to provide slippage when the electric motor 19 is started. If desired, a control arm (not shown) can be employed to disengage the clutch 20 at will.

During normal operation of the device 10, it is necessary to hold the nut 14 against longitudinal movement. This is accomplished by the release mechanisms 24 (shown in FIG. 1 and 3) that include a pair of box-like housings 70 mounted on opposite sides of the yoke 18 at the ends of the nut 14. Within each housing 70, a slide member 72 capable of reciprocation carries a small axle 74 that projects upwardly through a slot 75 in the housing extending perpendicularly to the direction of reciprocation and radially with respect to the nut 14. On the exposed top end of each axle 74 is a rotatable, disk-shaped, blocking member 76 that engages one flat end of the nut 14. As the nut 14 rotates, the blocking member 76 also rotates to minimize friction forces.

Each slide member 72 carries an arm 78 of reduced size that extends horizontally away from the axle 76. A coil spring 80 that surrounds the arm 78 biases the slide 72 toward its normal retaining position (shown in solid lines in FIG. 3) in which the blocking member 76 engages the nut 14. The arm 78 projects from the spring 80 through an aperture 82 in the housing 70 and is attached to a lever 84 by which it can be moved against the force of the spring 80. When the side slide member 72 is actuated in this manner, the associated blocking member 76 moves out of engagement with the nut 14 to permit free longitudinal movement of the nut and the worm 12 within the sleeve 16 (assuming the actuated position shown in broken lines in FIG. 3). Once the slide 22 has been moved, it can be secured in its actuated position by pivoting the lever 84 to abut the yoke 18 (as shown in broken lines).

The release mechanism 24 described above is used to permit movement of the worm 12 in the event of a power failure or a malfunction of the drive mechanism 10 that might otherwise render a sliding door 86 or other device to which the worm is connected inoperable. In an emergency, the release mechanism 24 can be actuated to permit more rapid movement of worm 12 than the drive mechanism 10 could produce.

Another form of the invention, illustrated in FIG. 5, incorporates a worm drive mechanism 10 of the same constuction as that shown in FIG. 1 (corresponding components being designated by the same reference numbers). The drive mechanism 10 is contained within a box-like housing 88 which supports a plurality of elongated, hollow, rigid, extension members 90a, b, and c. The extension members 90, being of progressively increased size, are telescopically internested and freely slidable on each other. As the worm 12 is moved longitudinally outwardly (to the right FIG. 5), the extension members 90 slide longitudinally, thus expanding so that they continue to surround the worm, the innermost extension member 90a being attached to the worm at its outer end.

The function of the extension members 90 is to render the worm 12 capable of withstanding compressive forces directed toward the drive mechanism 10 (in the direction of the arrow A in FIG. 5). The worm 12 can bend only until it presses against the inside surface of the extension members 90, after which further movement is firmly resisted. Nevertheless, as the worm 12 is withdrawn by rotation of the nut 14, the extension members 90 contract telescopically and do not interfere with the worm motion.

As the worm 12 is withdrawn in the direction of the arrow A, it is fed into a magazine 92 attached to the side of the drive mechanism 10 opposite from the extension members 90. The magazine 92 is formed by a tube in the shape of a spiral and contained within the housing 88. It enables the worm 12, which bends to conform to the configuration of the tube 92, to be stored in a relatively small area. While the tube 92 is shown in FIG. 5 as coiled within the housing 88, it can be bent to fit conveniently within the space available at a particular installation.

It will be appreciated that the present invention uniquely combines the advantages of being compact, light weight, inexpensively manufactured and easily installed. While preferred embodiments of the invention have been shown and described, it will be appreciated that many changes and modifications may be made without departing from the spirit and scope of the invention.

I claim:

1. A drive mechanism comprising:
   an elongated worm;
   a nut having at least one internal groove engaging said worm;
   a sleeve surrounding said nut;
   motor means for rotating said sleeve;
   locking means for locking said nut to said sleeve for rotation therewith; and
   release means for normally preventing longitudinal movement of said nut relative to said sleeve and for releasing said nut for longitudinal movement upon actuation thereof, said release means comprising (1) a blocking member having a retaining position in which it engages an end of said nut and a release position in which it does not engage said nut and (2) a release spring biasing said blocking member toward said retaining position.

2. The drive mechanism of claim 1 wherein said worm includes a member wound in the shape of a helix and received by the threads of said nut.

3. The drive mechanism of claim 2 further comprising a plurality of telescopically internested members arranged to receive said worm, thereby enabling said wound member to resist compressive forces.

4. The drive mechanism of claim 2 further comprising magazine means for bending and receiving said worm.

5. The drive mechanism of claim 2 further comprising:
   a plurality of rigid telescopically internested members arranged to receive said worm as it moves in a first direction, thereby enabling said worm to resist compressive forces; and
   magazine means for bending said worm and receiving it in a coiled configuration as it moves in a second direction.

6. The drive mechanism of claim 2 wherein said worm further includes at least one elongated restrainer connected to said wound member adjacent the ends of said wound member and also connected thereto at a plurality of intermediate points.

7. The drive mechanism of claim 1 further comprising a support member on which said sleeve is rotatably mounted, said release means also being mounted on said support member.

8. A drive mechanism comprising
   an elongated worm;
   a nut having at least one internal groove engaging said worm;
   a sleeve surrounding said nut;
   motor means for rotating said sleeve;
   locking means for locking said nut to said sleeve for rotation therewith, said locking means comprising a recess on the outer surface of said nut, a drive member carried by said sleeve, and a locking spring arranged to bias said drive member toward and into said recess; and
   release means for normally preventing longitudinal movement of said nut relative to said sleeve and for releasing said nut for longitudinal movement upon actuation thereof.

9. The drive mechanism of claim 8 wherein said release means comprises a pair of blocking members disposed at opposite ends of said nut, each of said blocking members having a retaining position in which it engages said nut and a release position in which it does not engage said nut, whereby movement of one of said blocking members to its release position permits free longitudinal movement of said nut with said worm member in one direction.

10. The drive mechanism of claim 8 wherein said recess extends longitudinally along said nut and is tapered to allow disengagement of said drive member from said recess upon longitudinal movement of said nut.

11. The drive mechanism of claim 8 wherein said worm includes a member wound in the shape of a helix received by said thread groove of said nut.

12. The drive mechanism of claim 11 wherein said worm further includes at least one elongated restrainer connected at its ends to said wound member to prevent elongation of said worm and also connected intermediate its ends to restrict axial displacement of said worm.

13. A drive mechanism comprising:
   an elongated worm including a flexible steel member wound in the shape of a helix and a flexible restrainer extending internally through said helix, said restrainer member being connected at and intermediate its ends to said wound member;
   an internally threaded plastic nut surrounding said worm and having a threaded internal surface that receives said wound member to produce longitudinal movement of said worm in response to rotational movement of said nut, said nut having a cylindrical outer surface;
   a plurality of rigid telescopically internested members arranged to receive said worm as it moves in a first direction, thereby enabling said worm to resist compressive forces;
   magazine means for receiving and storing said worm in a coiled configuration as it moves in a second direction, said magazine means including a flexible tube;
   a sleeve having a cylindrical inner surface surrounding said nut;
   a yoke on which said sleeve is rotatably mounted;
   motor means for causing rotation of said sleeve;

clutch means for operatively connecting said motor means to said sleeve and permitting relative rotation between said motor means and said sleeve, said clutch means comprising a first clutch plate secured to said sleeve for rotation therewith and a second clutch plate axially slidable on said sleeve to engage said first clutch plate;

locking means carried by said sleeve for locking said nut to said sleeve for rotation therewith, said locking means comprising a longitudinal groove defined by the outer surface of said nut, a drive pin carried by said sleeve, and a locking spring arranged to bias said drive pin toward and into said groove, said groove being tapered for maximum depth at the center thereof to allow disengagement of said drive pin from said groove upon longitudinal movement of said nut in either of two opposite directions; and release means for normally preventing longitudinal movement of said worm without corresponding rotation of said nut and for releasing said worm for free longitudinal movement upon actuation thereof, said release means including a pair of blocking members disposed at opposite ends of said nut, each of said blocking members having a retaining position in which it engages said nut and a release position in which it does not engage said nut, whereby movement of one of said blocking members to its release position permits free longitudinal movement of said nut and said worm member in one direction, said release means further including a pair of springs biasing said blocking members toward said retaining positions.

14. A drive mechanism comprising:
an elongated worm;
a nut having at least one internal groove engaging said worm;
a sleeve surrounding said nut;
motor means for rotating said sleeve;
locking means for locking said nut to said sleeve for rotation therewith, said locking means comprises a recess defined by the outer surface of said nut, a drive member carried by said sleeve, and a locking spring arranged to bias said drive member toward and into said recess, said recess extending longitudinally along said nut and being tapered for maximum depth at the center thereof to allow disengagement of said drive member from said recess upon longitudinal movement of said nut in either of two opposite directions; and release means for normally preventing longitudinal movement of said nut relative to said sleeve and for releasing said nut for longitudinal movement upon actuation thereof, said release means comprising a pair of blocking members disposed at opposite ends of said nut, each of said blocking members having a retaining position in which it engages said nut and a release position in which it does not engage said nut, whereby movement of one of said blocking members to its release position permits free longitudinal movement of said nut with said worm member in one direction.

* * * * *